United States Patent [19]

Crace

[11] Patent Number: 4,857,074

[45] Date of Patent: Aug. 15, 1989

[54] FLAVOR-IMPARTING PERMANENT BRIQUETTE FOR GAS AND ELECTRIC GRILLS

[75] Inventor: R. Joseph Crace, Brentwood, Tenn.

[73] Assignee: Hickory Specialties, Inc., Brentwood, Tenn.

[21] Appl. No.: 148,026

[22] Filed: Jan. 25, 1988

[51] Int. Cl.$^4$ .............................................. C10L 5/00
[52] U.S. Cl. ........................................ 44/540; 44/628; 99/487; 426/314
[58] Field of Search ................ 44/502, 504, 540, 606, 44/628, 541; 99/467, 481, 482; 126/25 R; 423/314

[56] References Cited

U.S. PATENT DOCUMENTS

| | | | |
|---|---|---|---|
| 418,316 | 12/1889 | Gathemann | 44/540 |
| 743,677 | 11/1903 | Bayles | 44/540 |
| 2,528,233 | 10/1950 | Kubricht | 99/234 |
| 3,089,760 | 5/1963 | Jaffe | 44/540 |
| 3,338,690 | 8/1967 | Calhoun | 44/6 |
| 3,454,377 | 7/1969 | Renwick, Jr. | 44/40 |
| 3,651,596 | 3/1972 | Orsing | 44/40 |
| 3,660,055 | 5/1972 | Haller | 44/41 |
| 3,693,534 | 9/1972 | Martin | 99/482 |
| 3,709,700 | 1/1973 | Ross | 44/606 |
| 3,906,849 | 9/1975 | Williams | 99/467 |
| 3,969,996 | 7/1976 | Huang et al. | 99/482 |
| 4,058,052 | 11/1977 | Hart | 99/646 |
| 4,102,653 | 7/1978 | Simmons et al. | 44/16 R |
| 4,104,408 | 8/1978 | Chiu | 426/135 |
| 4,190,677 | 2/1980 | Robins | 426/315 |
| 4,272,252 | 6/1981 | Altman | 44/540 |
| 4,298,435 | 11/1981 | Ledford | 426/314 |
| 4,299,851 | 11/1981 | Lowe | 426/132 |
| 4,523,927 | 6/1985 | Kuge et al. | 44/1 B |
| 4,779,525 | 10/1988 | Gaines | 99/482 |

*Primary Examiner*—Carl F. Dees
*Attorney, Agent, or Firm*—Richard E. Jenkins

[57] ABSTRACT

A permanent briquette for imparting flavor to food being cooked on gas and electric grills consisting of a permanent briquette saturated with a liquid smoke composition.

9 Claims, No Drawings

FLAVOR-IMPARTING PERMANENT BRIQUETTE FOR GAS AND ELECTRIC GRILLS

TECHNICAL FIELD

The present invention relates generally to the art of grilling and/or smoking meats and other foods on gas or electric grills of the type utilizing permanent briquettes. More particularly, the present invention relates to a permanent briquette that imparts a wood-like flavor and enhances the color of meats or other foods being cooked on gas or electric grills. The permanent briquette of the present invention consists essentially of a permanent briquette saturated with a liquid smoke solution.

BACKGROUND ART

The grilling or barbecuing of meats or other foods on an outdoor grill is an art mastered by few. The correct combination of taste and appearance is seldom attained by even the most accomplished outdoor chef. In an effort to facilitate the barbecuing procedure, many attempts have been made to improve barbecue grills and the briquettes utilized therewith. For example, gas and electric grills with permanent briquettes have recently begun to replace many conventional grills which use combustible charcoal briquettes. Although the technologically innovative gas and electric grills are extremely convenient to cook on, the permanent briquettes associated therewith, unlike conventional briquettes, do not contain a combustible carbonaceous material such as charcoal or wood and hence do not impart a natural charcoal or wood flavor to the meat or other food being cooked. This natural flavor is highly desirable to the discerning backyard chef.

One endeavor to impart flavor to food being cooked on a gas grill is disclosed in U.S. Pat. No. 4,058,052. Aluminum briquettes having liquid-retaining channels or pits are described which allow fat and juices of food being cooked to form a char on the surface of the briquettes so as to transmit flavorized vapors to the food being cooked. Unfortunately, the char layer is often difficult to produce and the amount of flavor transmitted to the food is difficult to control and generally inadequate when contrasted to flavor imparted by charcoal briquettes.

It is also known to place wood chips or the like into a bed of burning briquettes (charcoal or permanent) so as to produce smoke vapors which will impart a smoky flavor to the food being cooked. See, for example, U.S. Pat. No. 3,338,640. The wood chips, usually made of hickory or oak, tend to burn unevenly and initially produce an overabundance of smoke and little to no smoke in the latter stages of cooking. The chips also have a tendency to produce unwanted flaming which can burn the food being cooked. U.S. Pat. No. 4,102,653 describes a method of treating these wood chips with a combustion inhibiting solution so as to control the flaming and smoke emission rate of the chips. This method suffers from the fact that potentially hazardous chemicals are added to the chips which may be emitted later during the cooking process so as to contaminate the food being cooked.

Another method for producing wood smoke is explained in U.S. Pat. No. 4,190,677. This technique comprises placing a bed of wood flour between the heat source and the food being cooked so that the wood flour will smolder and emit smoke and vapor which is absorbed by the food. This method is disadvantageous in that the smoke is usually concentrated in one area of the grill and therefore does not provide for even flavoring of the food. Furthermore, the smoke produced from wood flour tends to impart a harsh or bitter flavor to the food being cooked thereover.

A need therefore exists for a permanent briquette which imparts wood-like flavor to food being cooked on gas and electric grills and overcomes the deficiencies of the above methods and devices.

DISCLOSURE OF THE INVENTION

In accordance with the present invention, an effective permanent briquette is provided which overcomes the aforementioned prior art deficiencies. The briquette of the present invention comprises a permanent briquette which is saturated with a liquid smoke solution or composition. The briquettes of the present invention can be saturated with various strengths of liquid smoke and can optionally be replenished with liquid smoke after total volatilization.

Accordingly, it is an object of the present invention to provide a permanent briquette which will impart a distinct smoke or wood flavor to food being cooked on gas and electric grills.

Another object of the present invention is to provide a permanent briquette which will allow for the even distribution of smoke vapors over the food being cooked.

Still another object of the present invention is to provide a permanent briquette which will impart a smoky flavor to food being cooked without causing flaming and resultant burning of the food.

Yet another object of the invention is to provide a permanent briquette which avoids the use of potentially hazardous chemicals which might be emitted during the cooking process.

BEST MODE FOR CARRYING OUT THE INVENTION

The permanent briquette of the present invention consists essentially of either a permanent non-combustible briquette or a natural lava rock saturated with a liquid smoke composition. Natural lava rock refers to a conventional lava rock product such as can be obtained from Colorado Aggregate Company of Newburgh, Ind. As known to those familiar with natural lava rock, it is obtained by mining therefor in locations such as Mesita, Colo. and is a by-product of volcanic eruptions. Lava rock does not have any inherent flavor producing properties but merely serves to catch and then vaporize juices which are produced by meats being cooked on a gas grill. In this fashion, an effort is made to impart more flavor to meats and the like being cooked on a gas grill utilizing a bed of re-usable, natural lava rock. Permanent briquettes may be used as a substitute for natural lava rock in gas grills and refers to a briquette-shaped product comprising blasters sand, cement, clay, black iron oxide, and sodium silica. This type of briquette product may be obtained from several sources including MP Midland Products, Inc. of Oseala, Nebr. When used hereinafter "permanent briquette" shall be understood to refer to both natural lava rock as well as permanent non-combustible briquettes as described above.

The liquid smoke composition utilized in the present invention is formed by condensing the smoke from burning wood into liquid form and thoroughly filtering the resulting liquid to remove ash and other unwanted substances. One method of producing liquid smoke is described in detail in U.S. Pat. No. 4,298,435. Any of the commercial liquid smoke compositions (such as LIQUID HICKORY SMOKE manufactured by Hickory Specialties, Inc. of Brentwood, Tenn.) can be used to make the product contemplated by the present invention as well as other natural or synthetic liquid smoke compositions known to those familiar with the art. Two representative examples of liquid smoke solutions or compositions are listed below in Tables 1 and 2. The liquid smoke composition described in Table 1 is a relatively weak solution, and the composition in Table 2 is a very strong solution. It is presently contemplated that liquid smoke or wood tar having a weight percent of acetic acid of as little as 1% to as high as 20% can be used in the present invention.

TABLE 1

| | |
|---|---|
| Acetic Acid (%) | 3.2–3.4 |
| Staining Index | 15–25 |
| Carbonyl Level (g/100 ml) | 2.5–7.5 |
| Phenol Level (mg/ml) | 2.5–7.5 |
| Specific Gravity @ 25 C | 1.018–1.024 |
| Density (lbs/gal) | 8.47–8.53 |
| Benzopyrene | Less than 1 part/billion |
| pH Level | 2.5–3.5 |
| Color | Amber |

TABLE 2

| | |
|---|---|
| Acetic Acid (%) | 15.5–16.5 |
| Staining Index | 130–175 |
| Carbonyl Level (g/100 ml) | 28–40 |
| Phenol Level (mg/ml) | 30–42 |
| Specific Gravity @ 25 C | 1.140–1.160 |
| Density (lbs/gal) | 9.5–9.67 |
| Benzopyrene | Less than 1 part/billion |
| pH Level | 2.0 |
| Color | Dark Amber |

The liquid smoke composition (either natural or synthetic) can be applied to the permanent briquettes in any manner which will cause the briquettes to become substantially saturated with the liquid smoke composition. For example, the permanent briquettes can be soaked in a solution of liquid smoke or can be sprayed or drenched with the liquid smoke solution. The permanent briquettes are then packaged by the manufacturer in a container, preferably air-tight, for shipment to distributors and retail outlets. If the saturated briquettes were not properly packaged in such a container the liquid smoke could evaporate, at least in part, prior to use thereof by the end user.

In use, the permanent briquette of the present invention is placed in an electric or gas grill and heated to volatilize the liquid smoke composition so that the resulting vapors impart an enhanced flavor and color to the food being cooked. Eventually, the liquid smoke solution is totally evaporated from the permanent briquettes. The briquettes may then be again soaked with any suitable liquid smoke composition or, in the alternative, used as conventional permanent briquettes.

It will thus be understood that various details of the invention may be changed without departing from the scope of the invention. Furthermore, the foregoing description is for the purpose of illustration only, and not for the purpose of limitation—the invention being defined by the claims.

What is claimed is:

1. A permanent briquette for imparting wood flavor to food being cooked on gas and electric grills comprising a permanent non-combustible briquette saturated therethrough with a liquid smoke food flavoring composition.

2. A permanent briquette according to claim 1 wherein the briquette is natural lava rock.

3. A permanent briquette according to claim 1 wherein the briquette is non-combustible and comprises sand, cement, clay, black iron oxide and sodium silica.

4. A permanent briquette according to claim 1 wherein the liquid smoke composition is about 1%–20% by weight of acetic acid.

5. A method of manufacturing a permanent briquette for gas and electric grills which has enhanced capability to impart wood flavor to food being cooked including the steps of:
providing a permanent non-combustible briquette;
applying liquid smoke food flavoring solution to said briquette so as to saturate saids briquette therethrough; and
packing said liquid smoke solution-soaked briquette in a container so as to inhibit evaporation of said smoke solution prior to use of said permanent briquette in a grill.

6. A method of manufacturing a permanent briquette according to claim 5 wherein said permanent briquette is natural lava rock.

7. A method according to claim 5 wherein said permanent briquette is non-combustible and comprises sand, cement, clay, black iron oxide and sodium silica.

8. A method according to claim 5 wherein said liquid smoke solution is about 1%–20% by weight of acetic acid.

9. A method according to claim 5 wherein said container for said permanent briquette is air-tight.

* * * * *